(12) United States Patent
Gordon et al.

(10) Patent No.: US 8,780,119 B2
(45) Date of Patent: Jul. 15, 2014

(54) RECONSTRUCTION RENDER FARM USED IN MOTION CAPTURE

(75) Inventors: Demian Gordon, Culver City, CA (US);
Dennis J. Hauck, Jr., Hermosa Beach, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 84 days.

(21) Appl. No.: 11/467,506

(22) Filed: Aug. 25, 2006

(65) Prior Publication Data

US 2007/0052711 A1    Mar. 8, 2007

Related U.S. Application Data

(60) Provisional application No. 60/711,971, filed on Aug. 26, 2005, provisional application No. 60/711,922, filed on Aug. 26, 2005.

(51) Int. Cl.
*G06T 13/00* (2011.01)

(52) U.S. Cl.
USPC ........................................ 345/474

(58) Field of Classification Search
None
See application file for complete search history.

(56) References Cited

U.S. PATENT DOCUMENTS

| | | | |
|---|---|---|---|
| 5,550,928 A | | 8/1996 | Lu et al. |
| 6,115,052 A | * | 9/2000 | Freeman et al. .............. 345/473 |
| 6,144,366 A | * | 11/2000 | Numazaki et al. ........... 345/156 |
| 6,324,296 B1 | * | 11/2001 | McSheery et al. ........... 382/107 |
| 2002/0019258 A1 | * | 2/2002 | Kim et al. ....................... 463/36 |
| 2003/0095186 A1 | * | 5/2003 | Aman et al. .................. 348/162 |
| 2004/0005004 A1 | | 1/2004 | Demos |
| 2004/0155962 A1 | * | 8/2004 | Marks ........................... 348/169 |
| 2006/0055699 A1 | * | 3/2006 | Perlman et al. ............... 345/473 |
| 2006/0055706 A1 | * | 3/2006 | Perlman et al. ............... 345/589 |
| 2006/0203096 A1 | * | 9/2006 | LaSalle et al. ........... 348/208.14 |

OTHER PUBLICATIONS

Daisaku Arita, Rin-ichiro Taniguchi, RPV-II: A Stream-Based Real-Time Parallel Vision System and Its Application to Real-Time Volume Reconstruction, Proceedings of the Second International Workshop on Computer Vision Systems, p. 174-189, Jul. 7-8, 2001.*

L. Herda, P. Fua, R. Pl ankers, D., R. Boulic, and D. Thalmann. Using skeleton-based tracking to increase the reliability of optical motion capture. Human Movement Science, 2001. http://citeseer.ist.psu.edu/herda01using.html.*

Eftychios Sifakis, Igor Neverov, Ronald Fedkiw, Automatic determination of facial muscle activations from sparse motion capture marker data, ACM Transactions on Graphics (TOG), v.24 n.3, Jul. 2005.*

Franco, J.-S., Ménier, C., Boyer, E., and Raffin, B. 2004. A Distributed Approach for Real Time 3D Modeling. In Proceedings of the IEEE Workshop on Real Time 3D Sensors and Their Use.*

(Continued)

*Primary Examiner* — Daniel Hajnik
(74) *Attorney, Agent, or Firm* — Procopio, Cory, Hargreaves & Savitch, LLP (57) ABSTRACT

Motion capturing markers coupled to at least one motion capture object, comprising: generating a plurality of Configurations, each Configuration including partitioning parameters; partitioning a motion capture beat into beat partitions using the plurality of Configurations; reconstructing the beat partitions, wherein each beat partition is reconstructed using each Configuration and corresponding motion capture camera calibration information to generate point data representing a marker; and merging the point data to form at least one master point file.

23 Claims, 8 Drawing Sheets

(56) References Cited

OTHER PUBLICATIONS

Jean-Marc Hasenfratz, Marc Lapierre and Francois Sillion, A Real-Time System for Full Body Interaction with Virtual Worlds, Eurographics Symposium on Virtual Environments EGVE, 2004, pp. 147-156.*

International Search Report and Written Opinion issued in PCT/US06/33710 on Feb. 20, 2008.

Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.

L. Herda et al., "Using Skelton-Based Tracking to Increase the Reliability of Optical Motion Capture", Human Movement Science, 2001. http://citeseer.ist.psu.edu/herda01using.html, figures 1a and 1b, abstract, and pp. 1-3 and 19.

Eftychios Sifakis et al., "Automatic Determination of Facial Muscle Activations From Sparse Motion Capture Marker Data", ACM Transactions of Graphics (TOG), v. 24 n. 3, Jul. 2005, figure 1.

Franco, J.-S., et al., "A Distributed Approach for Real Time 3D Modeling", in Proceedings of the IEEE Workshop on Real Time 3D Sensors and Their Use. 2004.

Office Action issued in U.S. Appl. No. 11/467,503, on Dec. 9, 2008.

Ueda, et al., "Implementing a Real-time Free-viewpoint Video System on a PC-cluster." Proceedings of the Seventh International Workshop on Computer Architecture for Machine Perception, 2005 (CAMP 2005), pp. 167-171, Jul. 2005.

* cited by examiner

RECONSTRUCTION RENDER FARM USED IN MOTION CAPTURE

CROSS-REFERENCE TO RELATED APPLICATIONS

This application claims the benefits of priority of co-pending U.S. Provisional Patent Application Ser. No. 60/711,971, filed Aug. 26, 2005, entitled "RECONSTRUCTION RENDER FARM USED IN MOTION CAPTURE", and co-pending U.S. Provisional Patent Application Ser. No. 60/711,922, filed Aug. 26, 2005, entitled "DATABASE USED IN MOTION CAPTURE". The disclosures of the above-referenced patent applications are hereby incorporated by reference.

BACKGROUND

The present invention relates to three-dimensional graphics and animation, and more particularly, to a motion capture system enabling improved efficiency in processing large motion capture data files.

Motion capture ("MOCAP") systems are used to capture the movement of a real object and map it onto a computer generated object. Such systems are often used in the production of motion pictures and video games for creating a digital representation of a person for use as source data to create a computer graphics ("CG") animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce realistic animations in many popular movies.

SUMMARY

The present invention provides systems and methods for reconstructing 3-dimensional data from a plurality of MOCAP cameras.

In one implementation, a method for motion capturing markers coupled to at least one motion capture object includes: generating a plurality of Configurations, each Configuration including partitioning parameters; partitioning a motion capture beat into beat partitions using the plurality of Configurations; reconstructing the beat partitions, wherein each beat partition is reconstructed using each Configuration and corresponding motion capture camera calibration information to generate point data representing a marker; and merging the point data to form at least one master point file.

In another implementation, a system for motion capturing markers coupled to at least one motion capture object includes: a parsing module configured to partition a motion capture beat into a plurality of beat files; a Configuration module configured to generate a plurality of Configurations, each Configuration including location information for at least one of the plurality of beat files; a reconstruction process manager module configured to reconstruct the plurality of beat files, wherein each beat file is reconstructed using each Configuration and corresponding motion capture camera calibration information to generate point data representing a marker; and a merging module configured to merge the point data to form a master point file.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In general, video captured by MOCAP cameras is passed to a MOCAP processing system, which uses the video to determine the locations and movements of markers on a target (or targets) in the field of view of the cameras. The processing system uses the location information to build and update a three-dimensional (3-D) model (i.e., "point clouds") representing the target(s). Building a 3-D model is often referred to as "reconstruction."

Thus, MOCAP reconstruction is a process by which image data from multiple MOCAP cameras are fused to form raw data point clouds in a virtual 3-D space. The process generally includes capturing MOCAP data into files that are used in conjunction with a predefined "Configuration." In this context, a Configuration generally includes a collection of processing steps tailored for a particular type of reconstruction processing. Accordingly, Configurations are often classified according to a MOCAP marker type and data characteristics, such as the part of a body (e.g., "face", "body", or "hand") represented by the data.

The reconstruction process typically receives as input a "beat", a Configuration, and MOCAP camera calibration information. The "beat" includes digital image data captured from a MOCAP shot. The MOCAP camera calibration information describes, for example, camera position and shot angle. The MOCAP camera calibration information can be represented by a plurality of calibration files corresponding to MOCAP cameras used to capture the beat.

A significant problem arises when, in certain applications, the digital image files including the beat (i.e., "beat files") are too large to be handled by conventional reconstruction processing. For example, a manageable input volume for a conventional reconstruction process may be about 1,000 frames, while some MOCAP beat files can include upwards of 13,000 frames. A failure to load such large files often results in system down time, with recovery sometimes requiring expensive man-hours and other resources.

Certain implementations as disclosed herein provide for a reconstruction render farm (RRF) to automatically partition otherwise unmanageably large motion capture files including a beat ("MOCAP beat files") into subsets of frames individually manageable by multiple MOCAP reconstruction processes.

In one implementation, the RRF uses a MOCAP database to determine which beats need to be reconstructed, and what type of reconstruction parameters to apply (e.g., "face," "body," "hand"). The RRF can split up the duties of tracking the beat among many computers so that each computer processes a smaller number of frames and the beat is reconstructed faster as a result. Beats split for reconstruction are merged back together as one contiguous file when reconstruction is complete.

In another implementation, the RRF uses the MOCAP database to determine where to get the data that need to be reconstructed, and where to save the files when finished. The RRF also updates the database as to the status of the file, including statuses indicating "ready," "finished," "aborted," "failed," "in progress," "successful," and others.

In a further implementation, the RRF provides for a MOCAP database in which MOCAP beat files are marked for reconstruction and are substantially parsed into partitions. Splitting a beat into partitions initiates automatically when a ready status is issued by a MOCAP database module. Each partition, with an associated Configuration and calibration information, is provided to one of a "farm" of reconstruction processes. When the reconstruction processes have completed, the RRF merges the resulting files of processed data to recover the entire, contiguous beat.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
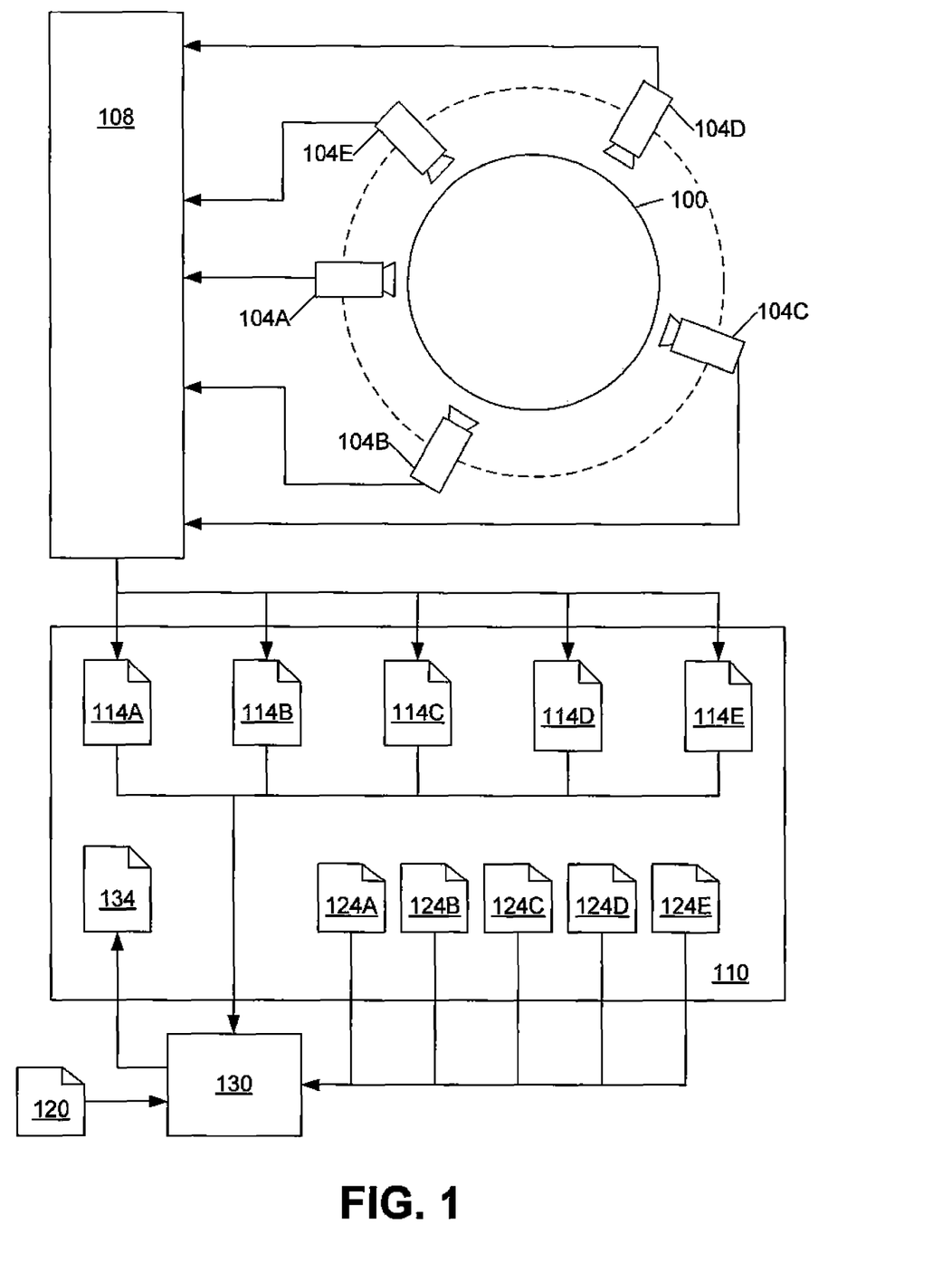
FIG. 1 is a functional block diagram illustrating elements of a MOCAP system that may be used in connection with various implementations.

FIG. 1 is a functional block diagram illustrating elements of a MOCAP system, which includes digital MOCAP cameras 104 arranged about a capture space 100, a MOCAP imaging module 108, a MOCAP database module 110, and a reconstruction render farm ("RRF") 130. The digital MOCAP cameras 104 are arranged about a capture space 100 at a variety of viewing angles. The capture space 100 is the area in which actors perform, for example, and whose motions are captured by recording the movement of attached markers, as discussed above. Additionally, inanimate objects may be placed in the capture space 100 and similarly equipped with markers. The positions of the MOCAP cameras 104 are precisely measured in physical 3-D space so that subsequent calculations of captured marker positions may be accurately mapped onto a computer generated object in virtual 3-D space.

For the purposes of simplicity, only five MOCAP cameras 104A-E are illustrated. However, for a typical MOCAP session, upwards of two hundred cameras or more are often used, arranged at various azimuths and elevations relative to the capture space 100. This helps to ensure precise resolution of marker positions in subsequent reconstruction processing. Further, a large number of cameras also ensures that markers are visible at all times to at least a subset of MOCAP cameras 104A-C, for example, thus substantially reducing detrimental effects resulting from markers being occluded at some view angles by an actor's body, for example, during the beat. Any marker of interest should still be captured by other MOCAP cameras 104D-E. Moreover, different types of markers may be used, requiring specially adapted MOCAP cameras to capture the views of only those particular markers. This further contributes to the total number of MOCAP cameras 104A-E.

The MOCAP imaging module 108 receives image data from the MOCAP cameras 104A-E and performs image processing and management functions to generate MOCAP image files. The MOCAP database module 110 stores and provides access to the generated MOCAP image files. In one implementation, a MOCAP image file is referenced according to a MOCAP "beat" (i.e., MOCAP session) in which the image file is acquired, and to the MOCAP camera 104A, for example, that captured the image data used to generate the image file.

The MOCAP database module 110 stores and manages at least 124A-E. The MOCAP database module 110 also receives and saves motion capture data, and updates status indicators, as will be explained in more detail below. It will be appreciated that the MOCAP database module 110 further manages access to other types of data such as beat reconstruction parameters pertaining to "face," "body," and "hand" processing.

In the illustrated implementation of FIG. 1, beat files 114A-E, generated and stored in the MOCAP database module 110, represent image data captured from corresponding MOCAP cameras 104A-E, respectively, during a single beat. The frames of data included in each beat file 114A-E span substantially the entire beat and are aligned according to time. That is, each beat file 114A-E can include multiple frames of image data, where corresponding frames in each beat file 114A-E are captured at substantially the same instant in time.

The RRF module 130 performs a 3-D reconstruction of a beat by fusing the MOCAP image data from multiple MOCAP cameras 104A-E into a single 3-D scene including raw marker data expressed as data points. The term "data points" is often referred to as a "point cloud." The RRF module 130 typically receives as input a set of beat files 114A-E, a Configuration 120, and calibration files 124A-E for each beat partition, as will be explained in detail below.

A Configuration 120 includes a sequence of processing steps to be applied with respect to the beat files 114A-E. The Configuration 120 may include acceptable ranges for marker representation size, for example. The calibration files 124A-E include information about the placement of MOCAP cameras 104A-E in "real" physical space, typically relative to the capture space 100. The MOCAP camera 104A, for example, should be uniquely positioned, and thus should have a corresponding calibration file 124A including information as to its unique position. It will be appreciated that when a large number of MOCAP cameras 104A-E are in use, there should also be a correspondingly large number of associated calibration files 124A-E.

As described above, the RRF module 130 uses the beat files 114A-E, the Configuration 120, and the calibration information in the calibration files 124A-E to generate raw, 3-D data point clouds in virtual space, each data point cloud substantially representing an object or actor in the capture space 100. One or more data point clouds are typically represented in a point file 134, which is generated by the RRF module 130. A point file 134 can be stored in and managed by a MOCAP database module 110.

Figure 2:
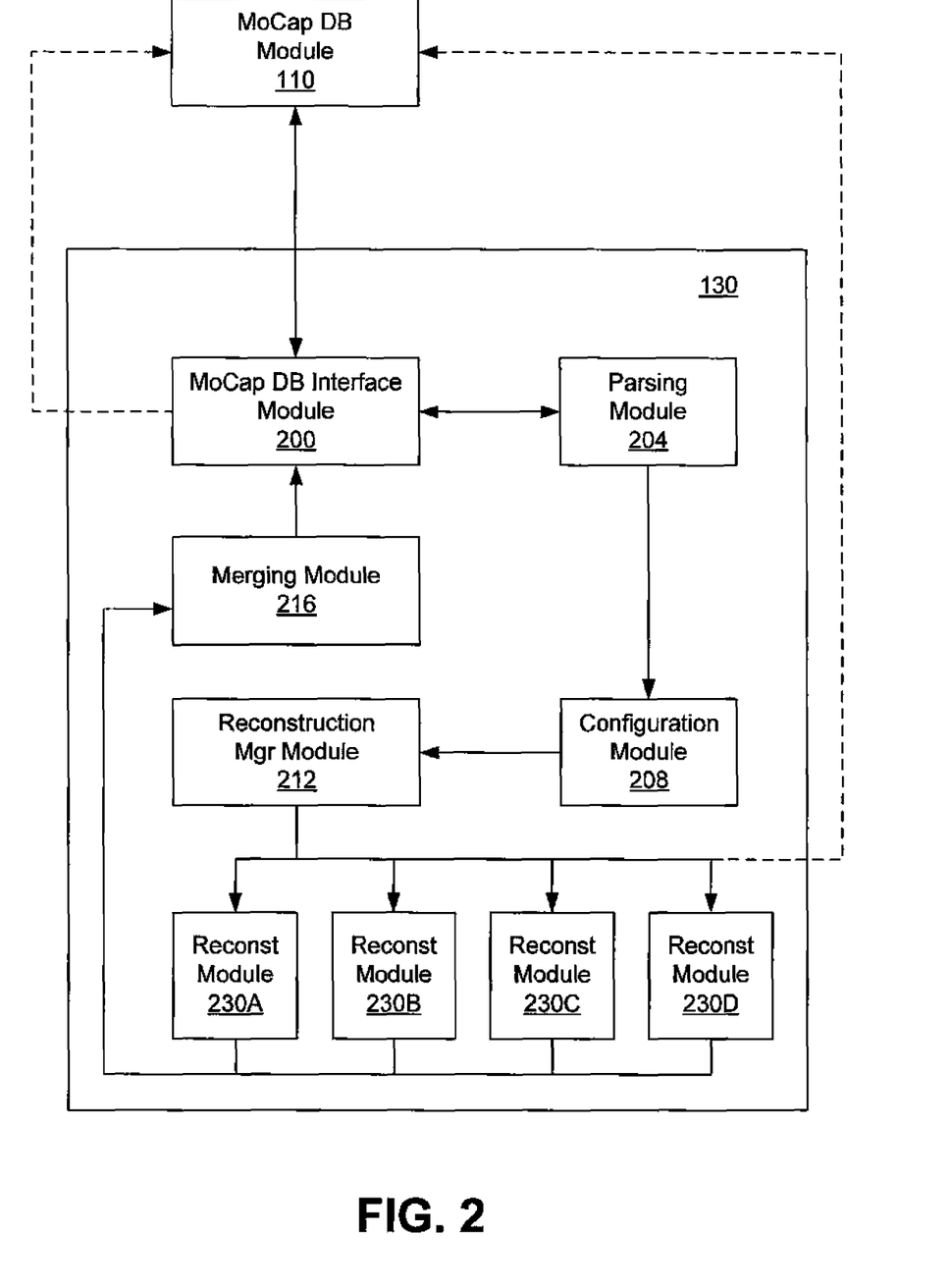
FIG. 2 is a detailed block diagram representing an example reconstruction module that may be used in connection with various implementations.

FIG. 2 is a detailed block diagram representing an example RRF module 130 that may be used in connection with various implementations described herein. In the illustrated implementation of FIG. 2, the RRF module 130 includes a MOCAP database interface module 200, a parsing module 204, a Configuration module 208, a reconstruction manager module 212, a plurality of reconstruction modules 230A-D, and a merging module 216. As discussed above, a MOCAP database module 110 determines when a beat, i.e., beat files 114A-E, are available for reconstruction processing, and sends a "ready" status to the MOCAP database interface module 200.

The MOCAP database interface module 200 performs input and output functions with respect to data stored in the MOCAP database module 110. The MOCAP database interface module 200 receives status information from and sends statuses to the MOCAP database module 110. These statuses include a "finished" status, indicating that beat reconstruction processing is complete, as well as statuses indicating processing states such as "aborted," "failed," "in progress," and "successful." It will be appreciated that other status indicators are also possible. Although the MOCAP database interface module 200 is shown to maintain access to a single MOCAP database module 110, the MOCAP database interface module 200 can maintain access to multiple other databases (not shown), including other MOCAP databases.

In the illustrated implementation, the parsing module 204 determines how to partition beat files (e.g., beat files 114A-E) into smaller-sized units efficient for processing in the reconstruction modules 230A-D. An efficient partition size can be calculated in real-time. Alternatively, an efficient partition size can be predetermined.

The parsing module 204 partitions the beat files 114A-E by subdividing the total duration of the current beat. Each subdivision can constitute a partition comprising a duration or number of frames that is efficient with respect to operational limitations of the reconstruction modules 230. For example, where a beat is 195 seconds in duration and an efficient partition is about 15 seconds, 13 efficient partitions result. Alternatively, partitioning may be done according to a number of frames. That is, where a beat may have about 13,000 frames, and a 1,000-frame size has been determined to be an efficient partition size, 13 such efficient partitions would again result. In both cases, a series of frame indices are generated and used to index into the beat files 114A-E. That is, where partitioning is performed according to time, frame indices corresponding to time-based subdivisions can therefore be determined.

An efficient partition size can also be determined according to the number of frames comprising the beat, or according to the number of reconstruction modules 230A-D available, or both. For example, where a beat is 195 seconds in duration and 20 reconstruction modules are available, the beat can be partitioned into 20 partitions, each partition being as short as about 9.75 seconds long. Alternatively, where partitioning is performed according to a number of frames, a beat having 13,000 frames distributed over the same 20 reconstruction modules can be partitioned into 20 partitions, each partition having a partition size of 650 frames per partition, which is significantly less than a maximum, for example, of about 1,000 frames. Thus, when more reconstruction modules are available, the beat reconstruction task load can be more widely distributed, using smaller partitions, and yielding greater overall system performance.

On receiving a ready status at the MOCAP database interface module 200, the parsing module 204 can automatically determine partitions for a currently available set of beat files 114A-E. Alternatively, on receiving a ready status at the MOCAP database interface module 200, the parsing module 204 can automatically seek and select beat files 114A-E that are marked for reconstruction. In one implementation, the parsing module 204 fetches beat files 114 available for reconstruction, performs partitioning on the beat files 114, subdivides the beat files 114A-E according to the partitions, and saves the resulting partitioned beat files 114A-E in the MOCAP database module 110. In some implementations, the parsing module 204 may be invoked manually to process a set of beat files 114A-E.

In one implementation, the Configuration module 208 generates a Configuration 120 corresponding to each partition determined at the parsing module 204. A Configuration 120 corresponds to a single partition and specifies indexing information identifying that partition. A Configuration 120 generally further includes a plurality of parameters used to control the details of reconstruction processing at a reconstruction module 230A-D. Other examples of a Configuration include parameters indicating minimum and maximum marker sizes as captured in the image data. Markers either too small or too large can be interpreted as being too far away or too close, and thus ignored as invalid for reconstruction processing (i.e., beyond the set limits). Similarly, a range of marker motion rates may be specified by Configuration parameters that direct reconstruction processing to ignore marker data that might spuriously indicate an object or actor moving too quickly or too slowly.

In one implementation, the Configuration module 208 obtains some or all of the Configuration parameter data discussed above from the MOCAP database module 110. In another implementation, the Configuration module 208 stores and manages some or all of the parameter data locally. As described above, a Configuration 120 may include a file. Alternatively, a Configuration 120 may include a message configured to transmit over a network link, or by inter-process communication means, to the reconstruction manager module 212.

The reconstruction manager module 212 receives a Configuration 120 for each partition of beat files 114A-E. In one implementation, the manager module 212 invokes a reconstruction module 230A-D for each Configuration 120, and thus for each partition determined at the parsing module 204. When invoking each reconstruction module 230A-D, the manager module 212 may further provide as input to each element: (1) a location of a beat files 114A-E in the MOCAP database module 110 available for processing; (2) a Configuration 120 including beat file frame indexing (i.e., partitioning) information; and (3) a set of associated calibration files 124A-E. The beat file location information can be expressed as a directory path to the MOCAP database module 110 or can be specified in a database access directive using a language such as SQL. Further, the beat file location information is provided to each beat of the reconstruction module 230A-D when it is invoked. It will be appreciated that while four reconstruction modules 230A-D are illustrated in FIG. 2 for the purposes of simplicity, it is possible that fewer reconstruction elements may be required. It is also possible that a significantly larger number of reconstruction elements may be required to handle the beat files corresponding to a large number of MOCAP cameras 104A-E. This can be especially true if the beat has a relatively long duration, containing a large number of frames.

In one implementation, the reconstruction modules 230A-D obtain the beat files 114A-E directly from the MOCAP database module 110. In another implementation, the reconstruction modules 230A-D obtain the beat files 114A-E through the MOCAP database interface module 200. In a further implementation, a reconstruction module 230A-D accesses only the specified partitions of the relevant beat files 114A-E. For example, a reconstruction module 230C receives beat data according to its assigned partition by accessing the MOCAP database module 110 using indexing information included in the Configuration 120. The MOCAP database module 110 then extracts the partitioned data from the corresponding partitions of the beat files 114A-E. Alternatively, the beat data may be similarly accessed at the MOCAP database module 110 using the indexing information and a MOCAP database interface module 200.

Once the reconstruction module 230A-D obtains partitioned beat data, it performs reconstruction processing according to parameters and information included in the Configuration 120 and the calibration files 124A-E. When the reconstruction process is completed, each reconstruction module 230A-D can then generate point cloud data representing one or more objects and/or actors whose motions were captured in that partition of the beat. Typically, such point cloud data are output as point files by the reconstruction modules 230A-D.

In the illustrated implementation of FIG. 2, the merging module 216 receives the output data point clouds associated with the beat partitions and merges them to form comprehensive data clouds substantially representing the entire beat. The merging module 216 receives outputs (e.g., data stored in point files) of the reconstruction modules 230A-D and merges the outputs to form a master point file 630 (illustrated in FIG. 6). It should be noted however that the merging module 216 will not be required in the case where the total length of the beat is less than the split frame range of 1000 frames.

Figure 3:
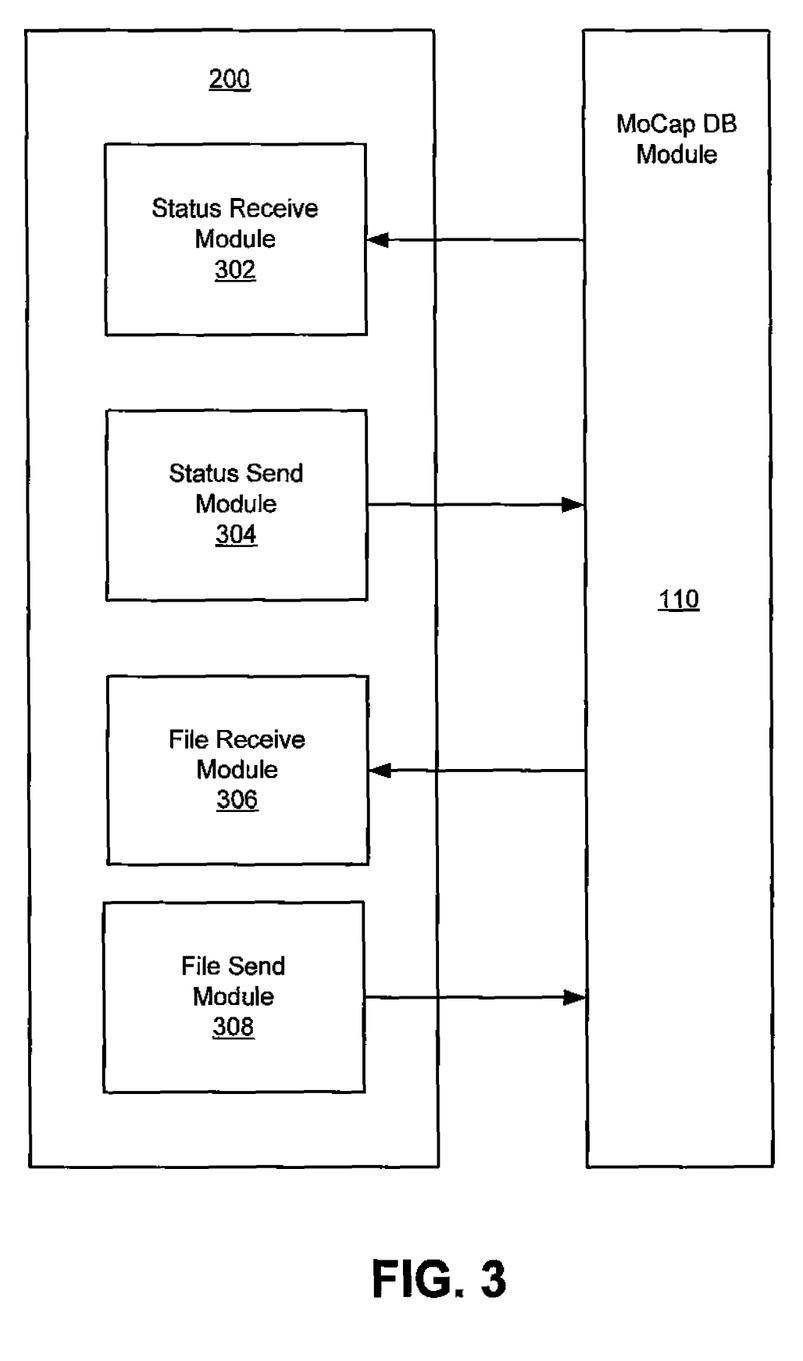
FIG. 3 is a functional block diagram representing a MOCAP database interface module that is be used in connection with various implementations.

FIG. 3 is a functional block diagram representing a MOCAP database interface module 200 that is used in connection with various implementations described herein. The MOCAP database interface module 200 is functionally coupled to the MOCAP database module 110, and includes a status receive module 302, a status send module 304, a file receive module 30G, and a file send module 308.

In the illustrated implementation, the status receive module 302 receives status information from the MOCAP database module 110. As discussed above, the received status information includes a "ready" status, indicating, for example, that beat files 114A-E are available at the MOCAP database module 110 for reconstruction processing. The status send module 304 provides capability to send status information to the MOCAP database module 110. In one implementation, the status send module 304 sends a "finished" status, a result of information coming from distributed reconstruction modules 230A-D, via the reconstruction manager module 212, or from a merging module 216, indicating that beat reconstruction processing is completed. Other statuses include "aborted", "failed", "in progress", "successful", and others indicating processing state or system health, for example. It will be appreciated that other types of statuses may be received and sent at the MOCAP database interface module 200.

The file receive module 306 enables the reconstruction modules 230A-D to receive beat files 114A-E from the MOCAP database module 110. Likewise, the file send module 308 enables certain files, including a point file 134, 634A-D and/or a master point file 630, to be transmitted to the MOCAP database module 110. In both cases, the files are sent to or received from the MOCAP database module 110 through the MOCAP database interface module 200. In one implementation, send and receive functionality at the MOCAP database interface module 200 is provided according to database protocols, such as those specified by the SQL programming language. In another implementation, a "flat file" database management scheme may be used, under which directory and file paths are used for direct file access. It will be appreciated, however, that many other file access schemes also provide the functionality described herein regarding the MOCAP database interface module 200.

Figure 4:
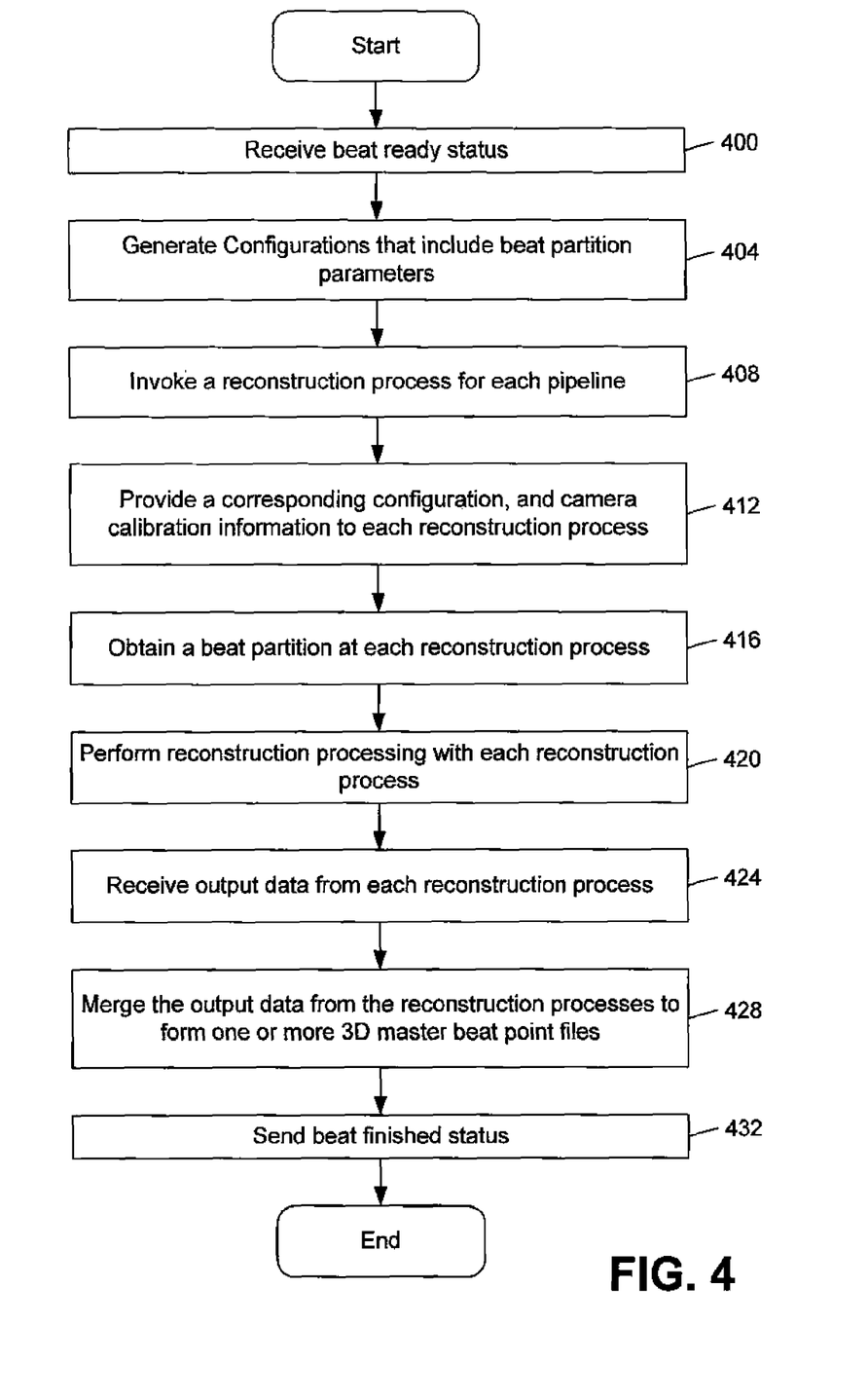
FIG. 4 is a flowchart illustrating a method of MOCAP reconstruction that may be used in connection with various implementations.

FIG. 4 is a flowchart illustrating a method of MOCAP reconstruction that may be used in connection with various implementations described herein. In the illustrated implementation of FIG. 4, a beat ready status is received, at 400. Configurations 120 are generated, at 404, including parameters for partitioning the beat data included in beat files 114A-E into beat partitions. That is, each beat file 114A-E includes a sequence of image frames spanning the beat. The partitioning information includes sub-ranges of frames in the sequence, expressed as frame indices. In the illustrated implementation of FIG. 2, this step is performed jointly by a parsing module 204 and a Configuration module 208. A reconstruction process is invoked, at 408, for each Configuration 120. The corresponding Configuration 120 and corresponding MOCAP camera calibration information are provided, at 412, for each reconstruction process thus invoked. These steps correspond to the function of a reconstruction manager module 212. Corresponding partitions of beat data are obtained by each reconstruction process, at 416. Reconstruction is performed in each reconstruction process, at 420, using the beat data partitions, a Configuration 120, and the MOCAP camera calibration information. Output data for each of the reconstruction processes are received, at 424. The output data thus received are next merged to form one or more 3-D data point clouds, at 428, which can be included in a master point file 630. In the illustrated implementation of FIG. 2, these steps are performed by a merging module 216. A "finished" status may then be conveyed, at 432, to a MOCAP database module 110.

Figure 5A:
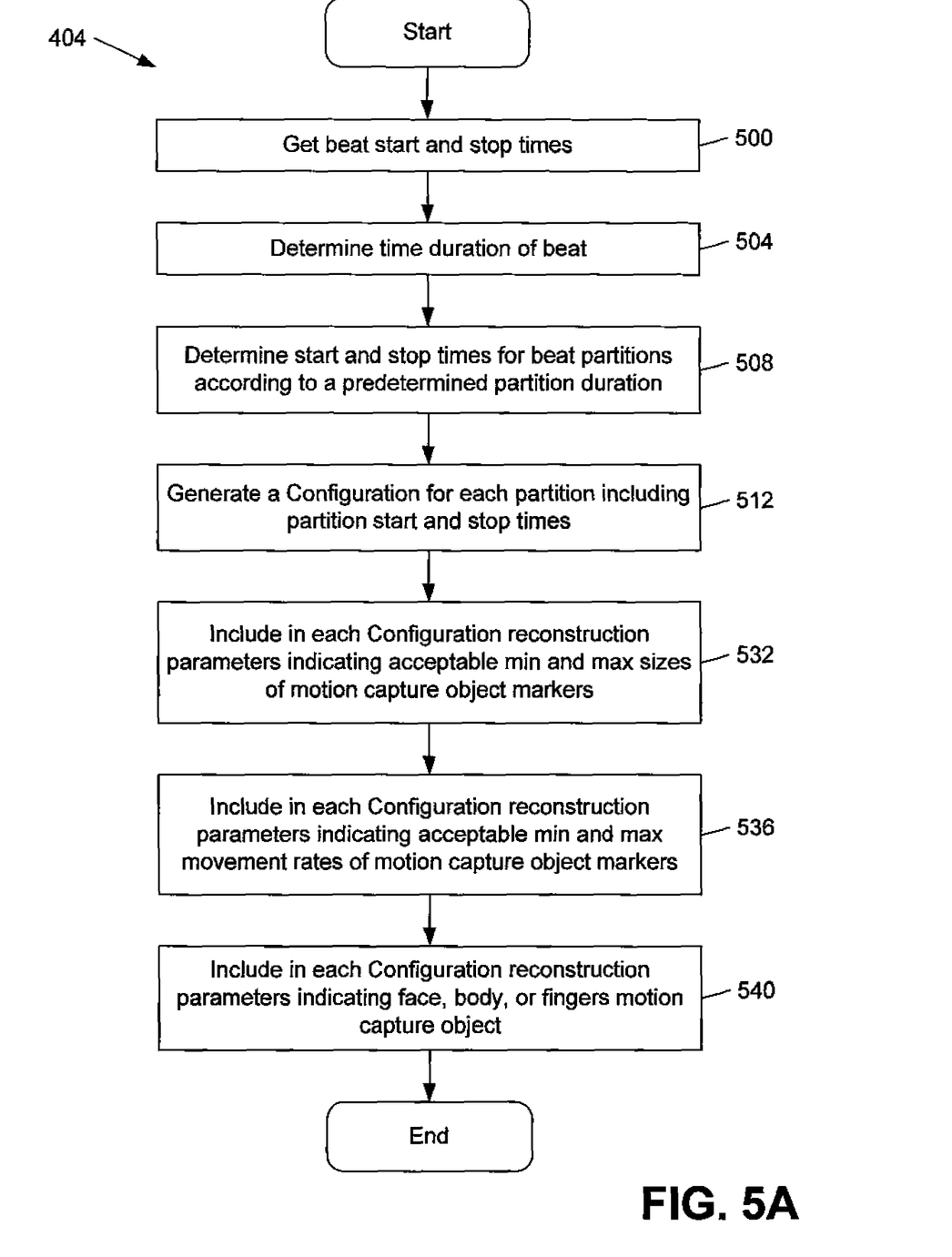
FIGS. 5A and 5B illustrate two implementations of a method of generating Configurations related to MOCAP reconstruction.
Figure 5B:
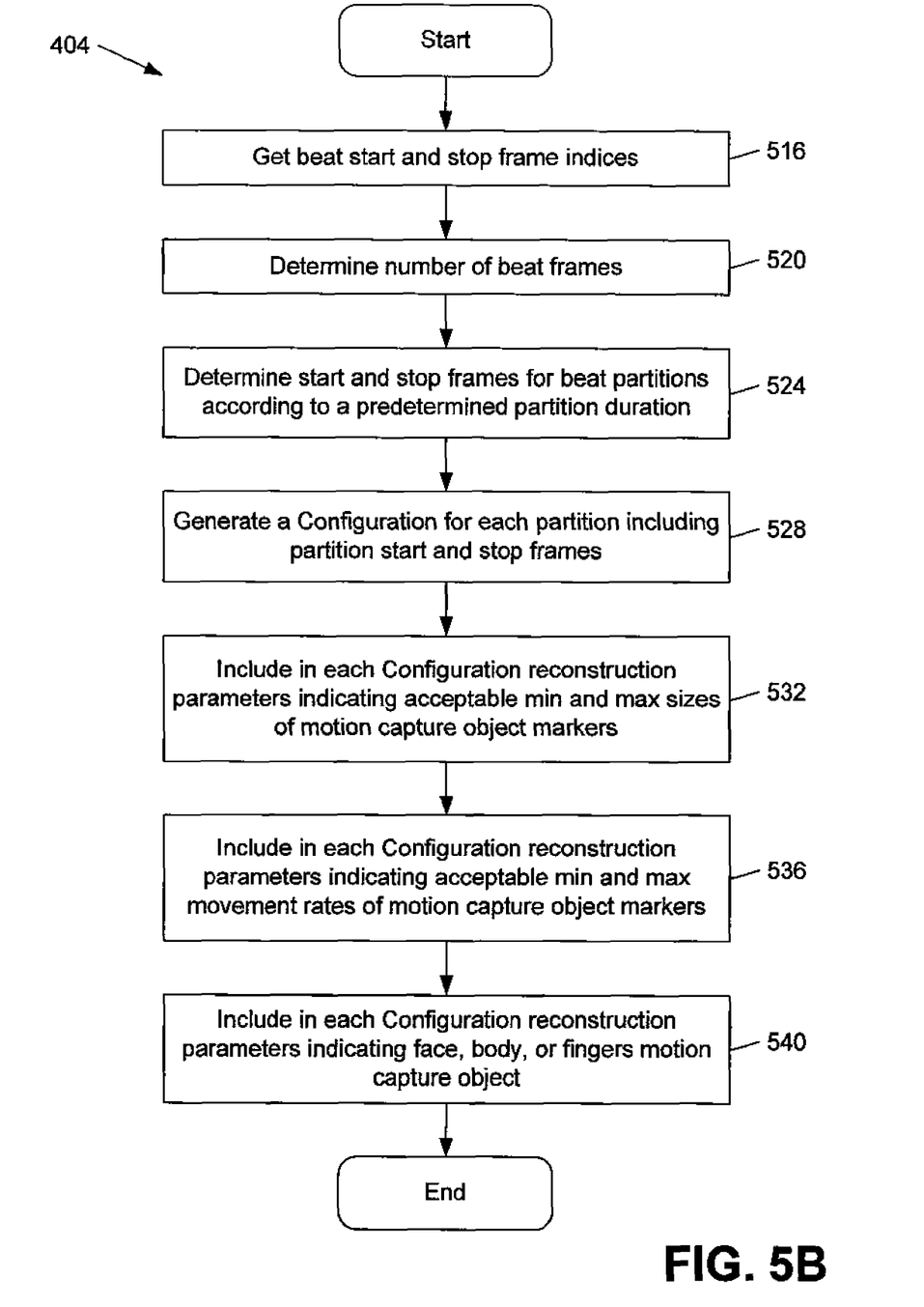

FIGS. 5A and 5B illustrate two implementations of a method of generating Configurations 120 related to MOCAP reconstruction. More specifically, the implementations illustrated in flowcharts relate to generating Configurations 120 that include beat data partitioning information (see step 404 of FIG. 4). The illustrated implementation of FIG. 5A performs beat partitioning on the basis of time, and the illustrated implementation of FIG. 5B performs beat partitioning on the basis of a frame index.

The time-based implementation of FIG. 5A includes obtaining the start and stop times of the current beat, at 500. From these start and stop times, the beat duration can be determined, at 504. Using predetermined partition duration information, start and stop times for beat partitions can be determined, at 508. In one implementation, predetermined partition durations are substantially efficient with respect to input limitations of a reconstruction process. For example, a partition duration should include no more data than a reconstruction process can handle at one time.

A Configuration 120 is then generated, at 512, including beat partition start and stop times. Beat reconstruction parameters indicating valid minimum and maximum sizes of MOCAP markers are also included in the Configuration, at 532. Similarly, beat reconstruction parameters indicating acceptable minimum and maximum movement rates of MOCAP markers may be included in the Configuration, at 536. Further, beat reconstruction parameters facilitating "face," "body," or "hand" processing, or any combination thereof, may be included in the Configuration, at 540. It will be appreciated that various parameters required for other functionality executed at a reconstruction process may also be included in the Configuration 120.

The frame-based implementation of FIG. 5B includes obtaining the start and stop frame indices of the current beat, at 516. From these start and stop frame indices, the number of frames spanning the duration of the beat can be determined, at 520. Using a predetermined partition duration, or predetermined number of frames, start and stop frame indices for partitions can be determined, at 524. Again, in one implementation, predetermined partition durations are substantially efficient with respect to input limitations of a is reconstruction process. For example, a partition length should include no more frames than a reconstruction process can handle at one time.

Similar to the time-based implementation, a Configuration 120 is generated, at 528, that includes beat partition start and stop times. Beat reconstruction parameters indicating valid minimum and maximum sizes of MOCAP markers may be included in the Configuration, at 532. Similarly, beat reconstruction parameters indicating acceptable minimum and maximum movement rates of MOCAP markers may be included in the Configuration, at 536. Further, beat reconstruction parameters facilitating "face," "body," or "hand" processing, or any combination thereof, may be included in the Configuration, at 540.

Various mappings can be developed between time and frame number. It will therefore be further appreciated that various combinations of time- and frame-based processing can be implemented, as well as other forms of indexing into beat files 114A-E to facilitate partitioning.

Figure 6:
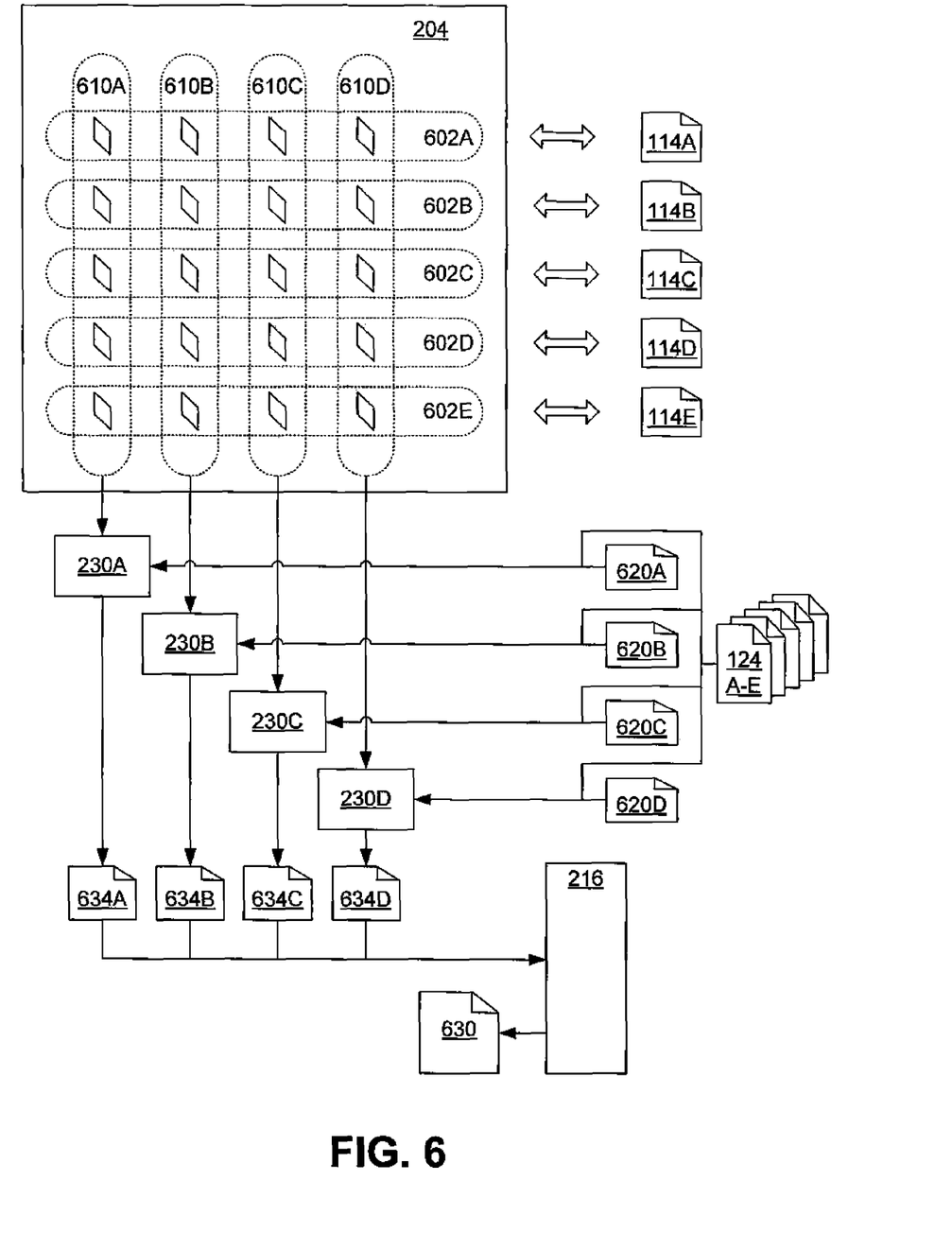
FIG. 6 is a functional block diagram illustrating a MOCAP system that may be used in connection with various implementations.

FIG. 6 is a functional block diagram illustrating a MOCAP system that may be used in connection with various implementations described herein. The illustrated implementation of FIG. 6 substantially correlates with the implementation illustrated in FIG. 2, and can provide an alternative perspective of beat partitioning.

As discussed above with respect to FIG. 1, in one example, beat files 114A-E include image data captured concurrently from corresponding MOCAP cameras 104A-E during a MOCAP beat. Whereas five beat files 114A-E are illustrated, in practice, beat files often number in direct correspondence with hundreds of MOCAP cameras.

In one implementation, the result of parsing the beat files 114A-E according to partitions determined at the parsing module 204 (see FIG. 2) may be viewed as groupings 602A-E of partitions, each grouping 602A-E substantially representing a beat file 114A-E. For example, if the beat file 114A contains 4,000 frames, the beat file 114A can be partitioned into four partitions of 1,000 frames each, shown in a first group 602A. In general, partitions need not be uniform in size or duration. However, beat files 114A-E should be partitioned substantially alike. The partitions of a grouping 602A can further be viewed as "virtual" partitions in that they exist in the context of determining start and stop times or frame indices referenced to the contents of the beat file 114A. Alternatively, the partitions can be "physical" partitions, where, for example, the beat file 114A is actually subdivided into a set of new, smaller files according to the partitioning.

The partitions of groups 602A-E corresponding to beat files 114A-E may also be viewed in "partition groups" 610A-D that are classified according to partition rather than a beat file. From this perspective, all partitions in partition group 610A, for example, are drawn from different beat files 114A-E, but are defined by the same start and stop frame indices. In this way, large beat files 114A-E that are unmanageably large can be virtually split into a number of smaller partitions to be processed substantially in parallel.

Accordingly, in one implementation, each partition group 610A-D is used at a reconstruction module 230A-D to form a corresponding point file 634A-D. In addition, a corresponding Configuration 620A-D and calibration files 124A-E can be provided by a reconstruction manager module 212 to each reconstruction module 230A-D for reconstruction processing. Point files 634A-D can then be merged at a merging module 216, resulting in a master point file 630. As discussed above, a master point file 630 may include one or more 3-D data point clouds representing markers coupled to objects or actors in the capture space 100. The point files 634A-D and a master point file 630 can be stored and managed by the MOCAP database module 110.

Figure 7:
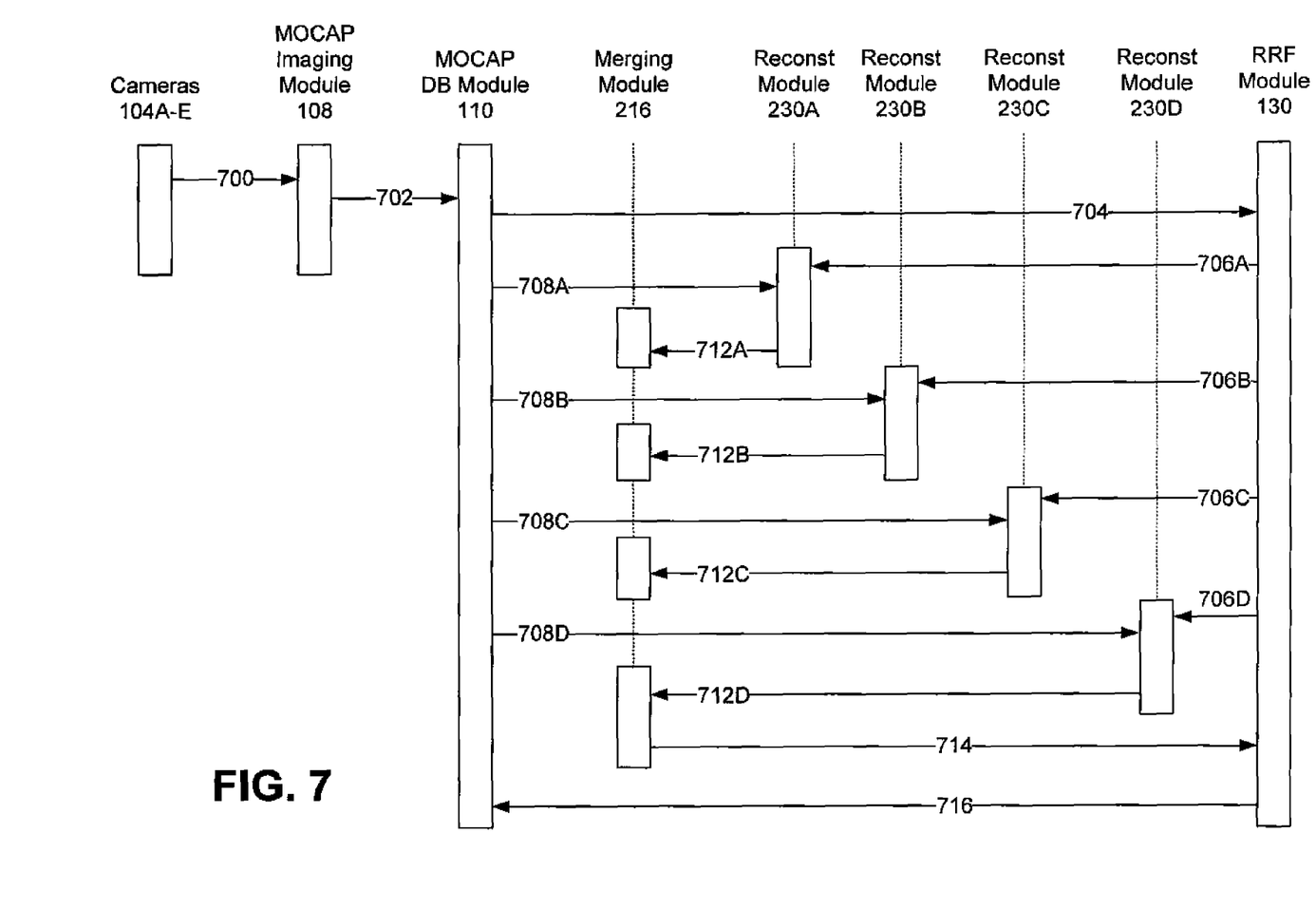
FIG. 7 is a diagram illustrating a relationship between processing modules according to an example method of MOCAP reconstruction.

FIG. 7 is a diagram illustrating a relationship between processing modules according to an example method of MOCAP reconstruction. The diagram illustrates an order of operations generally corresponding to the example implementations shown in FIGS. 2, 4 and 6.

In the illustrated implementation, digital MOCAP cameras 104A-E capture images of markers coupled to one or more objects or actors in a capture space 100. The images are conveyed (using a link 700) to a MOCAP imaging module 108 where various conventional image processing operations may be performed. Resulting images are conveyed (using a link 702) to a MOCAP database module 110 that provides file management and access facilities.

A "ready" status can then be issued (using a link 704) by the MOCAP database module 110 to a reconstruction render farm (RRF) module 130. The RRF module 130 includes the functionality of the MOCAP database interface module 200, the parsing module 204, the Configuration module 208, and the reconstruction manager module 212, as described in relation to FIG. 2. The ready status indicates that beat files 114A-E are available for reconstruction processing. Further, location information relating to the beat files 114A-E can be additionally provided. This information may include directory paths and file names. Alternatively, the RRF module 130 can search for marked beat files 114A-E at the MOCAP database module 110 and thus determine their locations accordingly. It will be appreciated, however, that it is possible to utilize other schemes for accessing beat files at the MOCAP database module 110.

The RRF module 130 generates Configurations 620A-D that include partitioning parameters. The RRF module 130 further invokes (using links 706A-D) reconstruction modules 230A-D and provides each with related beat file location information, a Configuration 620A-D, and calibration information usually contained in calibration files 124A-E. Each reconstruction module 230A-D can then perform reconstruction using the beat file partitions assigned via its associated Configuration 620A-D. Relevant partitions of the beat files can be sent (using links 708A-D) from the MOCAP database module 110 to the reconstruction module 230A-D.

In one implementation, each reconstruction module 230A-D can be executed on a separate or dedicated processor. In another implementation, the reconstruction modules 230A-D may execute as separate processes on a number of common processors. Further, the reconstruction modules 230A-D may execute synchronously or asynchronously with respect to each other, and with respect to the RRF module 130, the MOCAP database module 110, and any sub-processes executing within the reconstruction module.

In one implementation, when each reconstruction module 230A-D completes execution of beat reconstruction functions, the resulting point file 134 is conveyed (using links 712A-D) to the merging module 216. The point files 634A-D containing 3-D point data corresponding to partitions can then be merged to form usually one master point file 630, which may be conveyed (using a link 714) to the RRF module 130. A finished status can then be conveyed (using a link 716) to the MOCAP database module 110. Alternatively, the master point file 630 can be conveyed (using a link 716) to the MOCAP database module 110 with the finished status.

Various implementations may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A method of motion capturing markers coupled to at least one motion capture object, comprising:
   generating a motion capture beat by capturing markers coupled to at least one motion capture object using motion capture cameras, wherein the motion capture beat includes digital image data captured from a motion capture session;
   generating a plurality of Configurations, each Configuration including partitioning parameters and reconstruction parameters,
   wherein the reconstruction parameters indicate marker types including valid minimum and maximum sizes and acceptable minimum and maximum movement rates of the markers, and define a reconstruction processing which generates point data by fusing the digital image data from the motion capture cameras based on the marker types, and
   wherein each Configuration comprises a collection of processing steps tailored for a particular type of the reconstruction processing;
   partitioning the motion capture beat by subdividing the beat into beat partitions using said partitioning parameters, each beat partition comprising a duration that is efficient with respect to operational limitations of a reconstruction module;
   reconstructing said beat partitions using the reconstruction module, wherein each beat partition is reconstructed using said reconstruction parameters and corresponding motion capture camera calibration information to generate the point data representing a marker; and
   merging said point data to form at least one master point file.

2. The method of claim 1, wherein said at least one master point file includes
   at least one three-dimensional data point cloud representing the markers coupled to said at least one motion capture object.

3. The method of claim 1, wherein said partitioning parameters are determined according to at least one predetermined partition size.

4. The method of claim 3, wherein said predetermined partition size is characterized by a time duration.

5. The method of claim 3, wherein said predetermined partition size is characterized by a quantity of motion capture beat frames.

6. The method of claim 1, wherein each reconstruction parameter of said reconstruction parameters correspond to a motion capture face object.

7. The method of claim 1, wherein each reconstruction parameter of said reconstruction parameters correspond to a motion capture body object.

8. The method of claim 1, wherein each reconstruction parameter of said reconstruction parameters correspond to a motion capture hand object.

9. The method of claim 1, wherein said reconstruction parameters include minimum and maximum marker sizes so that markers too small or too large can be interpreted as being too far away or too close for said reconstructing said beat partitions.

10. The method of claim 1, wherein said reconstruction parameters include a range of marker motion rates that direct said reconstructing said beat partitions to ignore marker data that might spuriously indicate an object or actor moving too quickly or too slowly.

11. A non-transitory computer-readable storage medium storing a computer program module for motion capturing markers coupled to at least one motion capture object, the computer program module comprising:
    a motion capture beat generation module configured to receive data captured from markers coupled to at least one motion capture object, the data captured using motion capture cameras,
    wherein the motion capture beat includes digital image data captured from a motion capture session;
    a parsing module configured to partition the motion capture beat by subdividing the motion capture beat into a plurality of beat files using partitioning parameters;
    a Configuration module configured to generate a plurality of Configurations, each Configuration including partitioning parameters and reconstruction parameters, the partitioning and reconstruction parameters including location information for at least one of said plurality of beat files,
    wherein the reconstruction parameters indicate marker types including valid minimum and maximum sizes and acceptable minimum and maximum movement rates of the markers, and define a reconstruction processing which generates point data by fusing the digital image data from the motion capture cameras based on the marker types, and
    wherein each Configuration comprises a collection of processing steps tailored for a particular type of the reconstruction processing;
    a reconstruction process manager module configured to reconstruct said plurality of beat files,
    wherein each beat file comprises a duration that is efficient with respect to operational limitations of the reconstruction process manager module, and
    wherein each beat file is reconstructed using said reconstruction parameters and corresponding motion capture camera calibration information to generate said point data representing a marker; and
    a merging module configured to merge said point data to form a master point file.

12. The non-transitory computer-readable storage medium of claim 11, further comprising
    a motion capture database module configured to store and manage said motion capture beat and said plurality of beat files.

13. The non-transitory computer-readable storage medium of claim 12, further comprising
    a motion capture database interface module configured to:
    receive a status indicating an availability of said motion capture beat for reconstruction processing; and
    send a status indicating that the reconstruction processing has completed.

14. The non-transitory computer-readable storage medium of claim 11, wherein said at least one master point file includes
    at least one three-dimensional data point cloud representing markers coupled to said at least one motion capture object.

15. The non-transitory computer-readable storage medium of claim 11, wherein said partitioning parameters are determined according to at least one predetermined partition size.

16. The non-transitory computer-readable storage medium of claim 15, wherein said predetermined partition size is characterized by a time duration.

17. The non-transitory computer-readable storage medium of claim 15, wherein said predetermined partition size is characterized by a quantity of motion capture beat frames.

18. The non-transitory computer-readable storage medium of claim 11, wherein said reconstruction process manager module reconstructs said plurality of beat files using a plurality of reconstruction processes.

19. The non-transitory computer-readable storage medium of claim 18, wherein each reconstruction process of said plurality of reconstruction processes is provided with a location of each beat file.

20. The non-transitory computer-readable storage medium of claim 19, wherein said location of each beat file includes a directory path.

21. The non-transitory computer-readable storage medium of claim 18, wherein each reconstruction process of said plurality of reconstruction processes is provided with said motion capture camera calibration information.

22. The non-transitory computer-readable storage medium of claim 18, wherein at least one of said plurality of reconstruction processes is executed by a dedicated processor.

23. A non-transitory computer-readable storage medium storing a computer program for motion capturing markers coupled to at least one motion capture object, the computer program comprising executable instructions that cause a computer to:
    generate a motion capture beat by receiving data captured from markers coupled to at least one motion capture object using motion capture cameras,
    wherein the motion capture beat includes digital image data captured from a motion capture session;
    generate a plurality of Configurations, each Configuration including partitioning and reconstruction parameters,
    wherein the reconstruction parameters indicate marker types including valid minimum and maximum sizes and acceptable minimum and maximum movement rates of the markers, and define a reconstruction processing which generates point data by fusing the digital image data from the motion capture cameras based on the marker types, and
    wherein each Configuration comprises a collection of processing steps tailored for a particular type of the reconstruction processing;
    partition the motion capture beat by subdividing the beat into beat partitions using said partitioning parameters, each beat partition comprising a duration that is efficient with respect to operational limitations of a reconstruction module;
    reconstruct said beat partitions using the reconstruction module, wherein each beat partition is reconstructed using said reconstruction parameters and corresponding motion capture camera calibration information to generate the point data representing a marker; and
    merge said point data to form at least one master point file.

* * * * *